United States Patent
Ooms

[19]

[11] Patent Number: 6,068,321
[45] Date of Patent: May 30, 2000

[54] MOTOR VEHICLE INCLUDING A POWER ACTUATED TAILGATE

[75] Inventor: Nevill P. Ooms, Huntington Beach, Calif.

[73] Assignee: DaimlerChrysler Corporation, Auburn Hills, Mich.

[21] Appl. No.: 09/222,563

[22] Filed: Dec. 29, 1998

[51] Int. Cl.[7] .................................................. B62D 33/03
[52] U.S. Cl. ...................................... 296/57.1; 296/146.4
[58] Field of Search ............................... 296/50, 57.1, 55, 296/146.4, 146.8

[56] References Cited

U.S. PATENT DOCUMENTS

| | | | |
|---|---|---|---|
| 1,380,229 | 5/1921 | Manheim | 105/378 |
| 2,059,737 | 11/1936 | Mather | 49/136 |
| 3,004,757 | 10/1961 | Lohr | 181/266 |
| 3,306,655 | 2/1967 | Voehringer | 296/57.1 |
| 4,702,511 | 10/1987 | Olins | 296/57 |
| 5,449,212 | 9/1995 | Seifert | 296/57.1 |

FOREIGN PATENT DOCUMENTS

| | | | |
|---|---|---|---|
| 12371 | 7/1889 | United Kingdom | 296/57 |
| 412315 | 6/1934 | United Kingdom | 296/57.1 |

*Primary Examiner*—D. Glenn Dayoan
*Assistant Examiner*—Lori L. Coletta
*Attorney, Agent, or Firm*—Mark P. Calcaterra

[57] ABSTRACT

A motor vehicle includes a body, a closure panel and a drive arrangement. The closure panel, which in one exemplary form is a tailgate for a pick-up truck, is attached to the body for rotation about a horizontally extending pivot axis located adjacent a lower edge of the closure panel. The closure panel is pivotable between a closed position in which an upper edge of the closure panel is located adjacent the body and an open position in which the upper edge is displaced from the body. The drive arrangement is attached to the body and is operative for articulating the closure panel between the open position and the closed position. The drive arrangement preferably includes first and second flexible cables in the form of chains which extend from side walls of the body and are attached to the closure panel. A drive rod is pivotally mounted to the body for rotation about an axis parallel to the horizontally extending pivot axis. A second end of the flexible cables are interconnected to the drive rod.

21 Claims, 2 Drawing Sheets

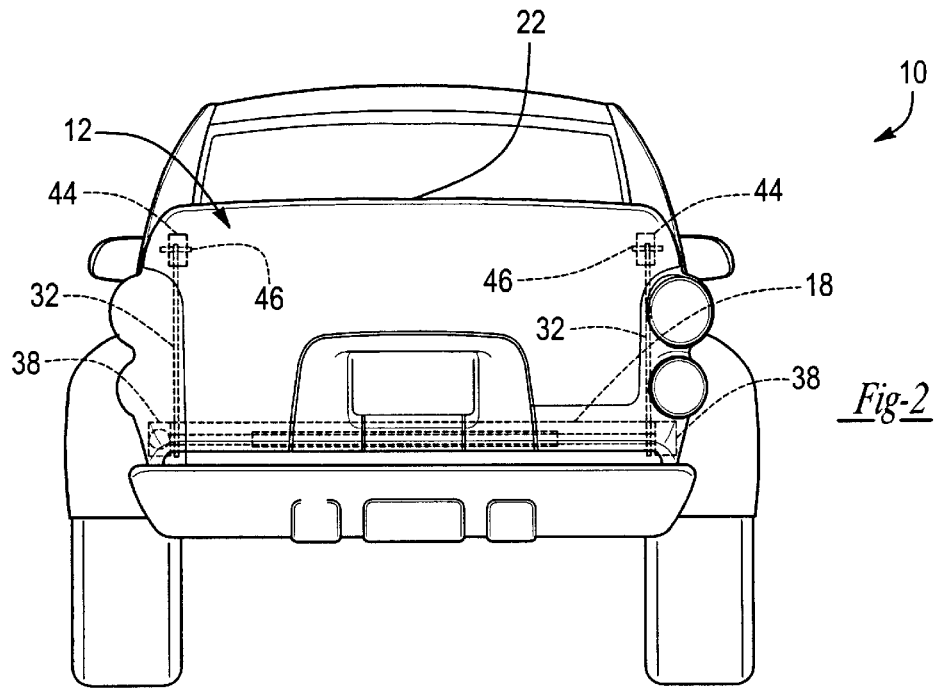
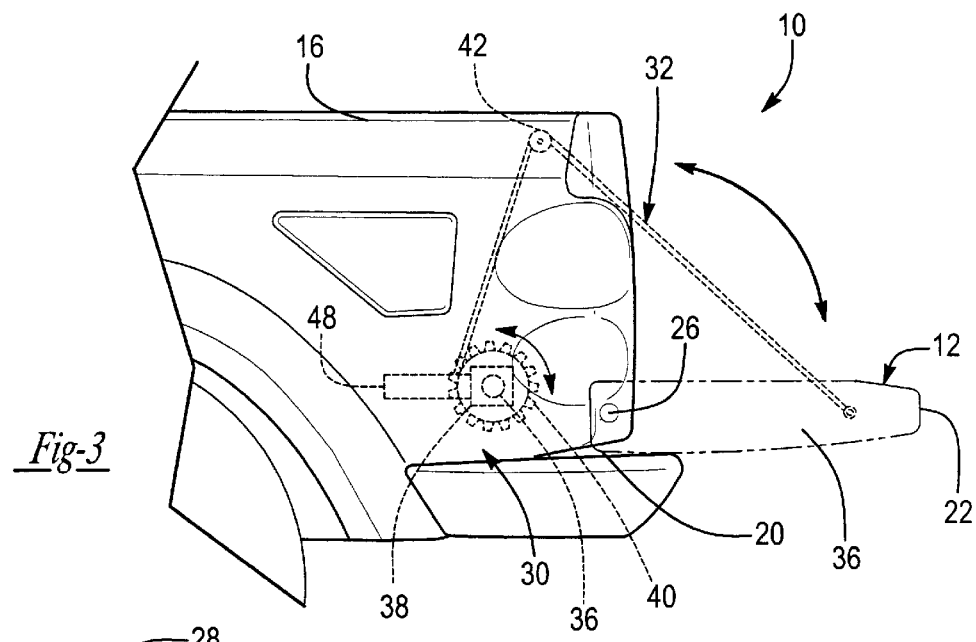
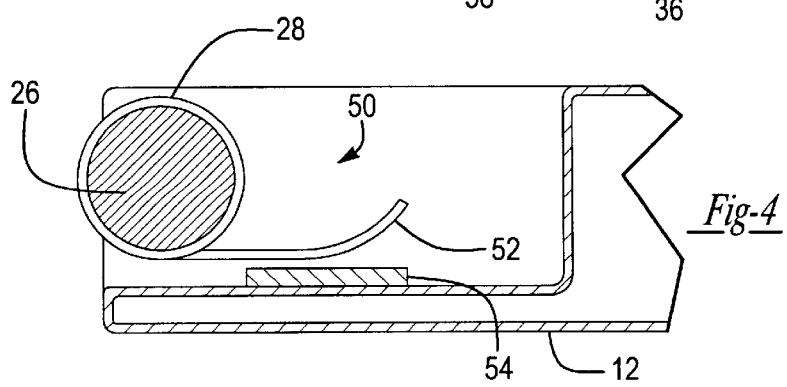

MOTOR VEHICLE INCLUDING A POWER ACTUATED TAILGATE

BACKGROUND OF THE INVENTION

1. Technical Field

The present invention generally pertains to motor vehicles. More particular, the present invention pertains to a power actuated closure panel for a motor vehicle. More specifically, but without restriction to the particular embodiment and/or use which is shown and described for purposes of illustration, the present invention relates to pick-up truck having a tailgate attached to the body for rotation about a horizontal pivot axis about a lower edge of the tailgate and a drive mechanism for articulating the tailgate between a closed position and an open position under a source of power.

2. Discussion

In sport utility vehicles, station wagons, minivans and other similar vehicles having a substantially vertical rear access opening, there is often provided a sideways-type swinging tailgate that swings about a generally vertical axis. Minimal effort is required to open and close such a tailgate. It is also typical in such vehicles to provide a liftgate which upwardly swings about a horizontal axis to open or a tailgate which swings downward about a horizontal axis to open. Downwardly swinging tailgates are also common on pick-up trucks for providing access to the bed area. Where the tailgate or liftgate pivots about a horizontal axis significant manual effort is required for opening and closing.

For the convenience of the people using a vehicle having a tailgate or liftgate which pivots about a horizontal axis, it is desired to provide a power lift system to relieve a person of the required effort for opening and closing. However, there is limited space in the vehicle body for a power lift system to handle the lift effort required. Known arrangements for articulating a vehicle door about a horizontal axis under a source of power have been primarily directed to liftgates which pivot about an upper axis. For example, commonly assigned U.S. Pat. No. 5,531,498 is directed to such an arrangement and is hereby incorporated by reference as if fully set forth herein. It remains desirable to provide a suitable arrangement for articulating a vehicle tailgate about a lower horizontal axis under a source of power.

SUMMARY OF THE INVENTION

It is a general object of the present invention to provide a motor vehicle including a power actuated tailgate which overcomes the disadvantages associated prior known arrangements.

It is another object of the present invention to provide a motor vehicle which offers a simple construction, cost efficient, and easy to install, power actuated tailgate.

It is another object of the present invention to provide a motor vehicle having a tailgate which is power actuated by a single electric motor.

In one form, the present invention provides a motor vehicle including a body, a tailgate and a drive arrangement. The tailgate is attached to the body for rotation about a horizontally extending pivot axis located adjacent a lower edge of the tailgate. The tailgate is pivotable between a closed position in which an upper edge of the tailgate is located adjacent the body and an open position in which the upper edge is displaced from the body. The drive arrangement is operative for articulating the tailgate between the open position and the closed position.

In a more detailed form, the present invention provides a pick-up truck including a body, a tailgate and a drive arrangement. The body includes first and second side walls and a bed floor defining a bed. The tailgate includes first and second laterally opposed sides. The tailgate is attached to the body for rotation about a horizontally extending pivot axis located adjacent a lower edge of the tailgate. The tailgate is pivotable between a closed position in which an upper edge of the tailgate is located adjacent the body and an open position in which the upper edge is displaced from the body. The drive arrangement includes a pair of flexible cables attached to the body for articulating the tailgate between the open position and the closed position. The drive arrangement is attached to the tailgate.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 2 is a rear view of the motor vehicle of the present invention.

FIG. 3 is an enlarged side view of a portion of the motor vehicle of the present invention, illustrated with the tailgate articulated to an open position and further illustrating a drive arrangement for articulating the tailgate between the closed position and the open position under a source of power.

FIG. 4 is a cross-sectional view taken through the horizontally extending pivot rod of the motor vehicle and illustrating a biasing arrangement for biasing the tailgate to the open position.

DETAILED DESCRIPTION OF THE PREFERRED EMBODIMENT

Figure 1:
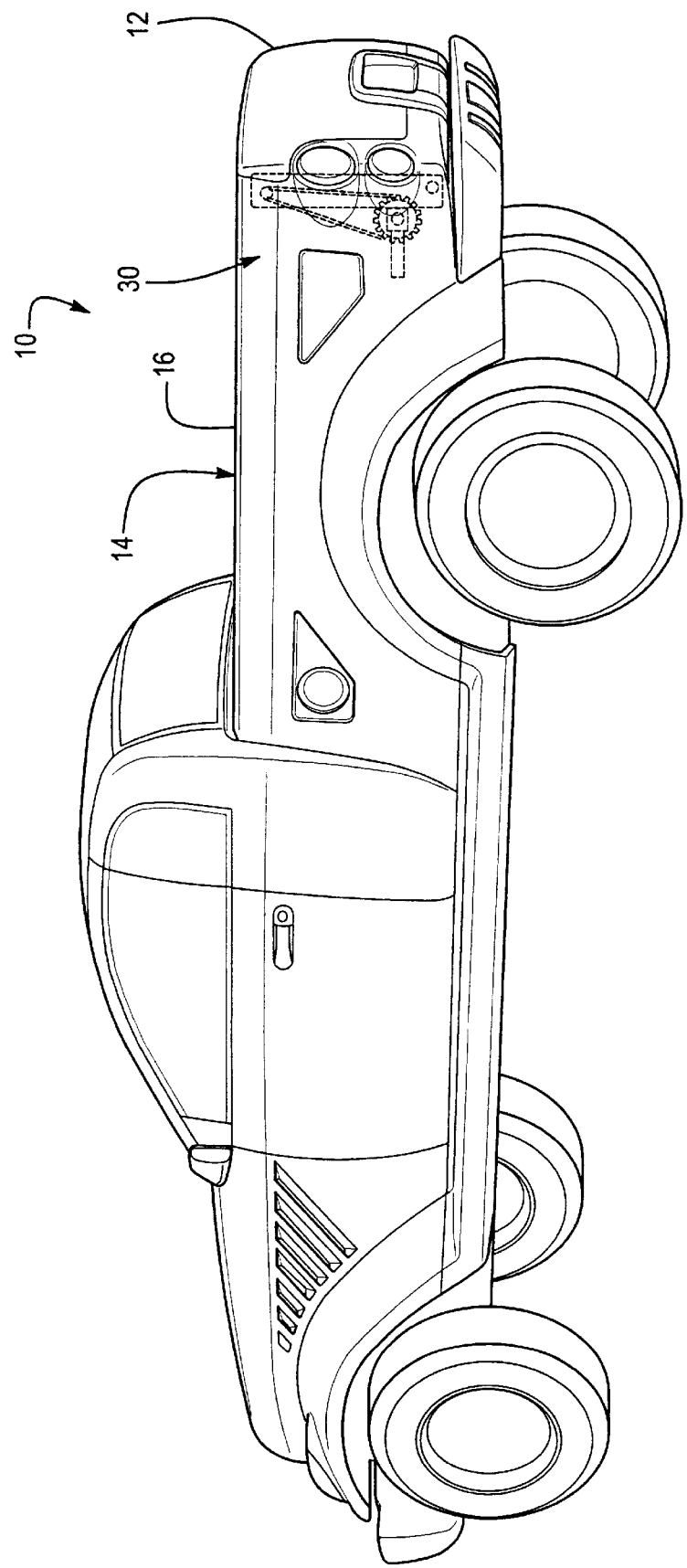
FIG. 1 is a perspective view of a motor vehicle constructed in accordance with the teachings of a preferred embodiment of the present invention to include a power actuated tailgate, the tailgate illustrated articulated to a closed position.

With reference to the drawings, a motor vehicle constructed in accordance with the teachings of the preferred embodiment of the present invention is generally identified at reference numeral 10. As will be discussed in detail below, the motor vehicle 10 includes a closure panel 12 which is articulated between a closed position and an open position under a source of power. The motor vehicle shown throughout the drawings is illustrated as a pick-up truck 10. However, it will be understood that the teachings of the present invention have applicability to other types of vehicles, including but not limited to sport utility vehicles, minivans, station wagons and other vehicles having a tailgate which pivots about a lower horizontal axis.

The motor vehicle 10 includes a body 14 having a pair of laterally spaced apart bed walls 16 and a bed floor 18 (shown in phantom in FIG. 2) which conventionally define a bed. The tailgate 12 is shown mounted to the body 14 of the motor vehicle 10 adjacent a lower edge 20 of the tailgate 12. The tailgate 12 is articulable between a closed position (shown in FIGS. 1 and 2) and an open position (shown in FIGS. 3 and 4). In the closed position, an upper edge 22 of the tailgate 12 is adjacent the body 14 of the vehicle 12. In the open position, the upper edge 22 of the tailgate 12 is rotated away from the body 14 of the vehicle 12.

The tailgate 12 is shown attached to the body 14 for rotation about a horizontally extending pivot rod 26. The pivot rod 26 transversely extends across the vehicle 10 and is fixedly attached to the body 14. A sleeve 28 (shown particularly in FIG. 4) is rotatably carried by the pivot rod 26. The tailgate 12 is welded or otherwise conventionally attached to the sleeve 28.

The vehicle 10 includes a drive arrangement 30 for articulating the tailgate 12 between the closed position and the open position under a source of power. The drive arrangement 30 includes a pair of flexible cables 32 both having an end attached to the tailgate 12. In the exemplary embodiment, the flexible cables 32 are each attached to a lateral side 36 of the tailgate 12 proximate to the upper edge 22 of the tailgate 12. Further in the exemplary embodiment, the flexible cables 32 are chains. The chains 32 operate to articulate the tailgate 12 in a drawbridge fashion as will be discussed below. It will be alternatively appreciated that other forms of flexible cables may be employed. Preferably, the flexible cables 32 have a fixed length.

The drive arrangement 30 of the present invention further includes a drive rod 36 pivotally mounted to the body 14 for rotation about an axis parallel to the horizontally extending pivot axis of the tailgate 12 defined by the pivot rod 26. In the preferred embodiment, the ends of the drive rod 36 are rotatably supported in suitable bushings 38 each disposed within an associated one of the sidewalls 16. The drive rod 36 is disposed below the floor 18 of the bed.

In the exemplary embodiment, the drive arrangement 30 additionally includes a pair of gears 40. The gears 40 are mounted to the drive rod 36 for rotation therewith and are both disposed within an associated one of the sidewalls 16. The gears 40 include teeth for meshingly engaging the links of an associated one of the pairs of flexible cables 32. It will be understood that the drive arrangement 30 is a substantial mirror image about a longitudinally extending vehicle centerline insofar as the drive rod 36, gears 40 and flexible cables 32 are concerned.

As shown most particularly in FIG. 3, each of the flexible cables 32 upwardly extends from an associated gear 40 where it is supported by a roller 42 and exits an aperture 44 in the associated sidewall 16. The aperture 44 is shown preferably located in an upper portion of a rear surface of the associated sidewall 16. The rollers 42 are supported for rotation about a pivot pin 46 fixedly mounted to the inner and outer panels of the sidewall 16.

The drive arrangement 30 of the present invention further includes a single drive motor 48 disposed in one of the sidewalls 16. The drive motor 48 is operatively associated with the drive rod 36 for rotating it about its longitudinal axis. While not specifically shown, it will be understood that the motor 48 is connected to the vehicle electrical system in a conventional manner. In the exemplary embodiment, the motor 48 is controlled by a switch (not shown) located in the passenger compartment of the motor vehicle 10. The motor 48 may also be actuated in a conventional manner with a remote control. When the tailgate 12 is in its open position, actuation of the motor 48 to rotate the drive rod 36 is a first direction (counterclockwise as shown in FIG. 3) functions to articulate the tailgate 12 to its closed position. Conversely, actuation of the motor 48 to rotate the drive rod 36 in a second direction (clockwise as shown in FIG. 3) lowers the tailgate 12 to its open position.

With particular reference to FIG. 4, the present invention is further illustrated to include a biasing arrangement 50 for biasing the tailgate 12 to its open position. The biasing arrangement 50 preferably includes a spring steel member 52 fixedly attached to the pivot rod 26. The spring steel member 52 upwardly curves as it extends rearward. When the tailgate 12 is rotated towards its closed position, the spring steel member 52 is upwardly deflected by the tailgate 12. A steel reinforcement plate 54 mounted to the tailgate 12 directly opposes the bias force of the spring steel member 52. The spring bias functions to urge the tailgate 12 to its open position and also maintains the flexible cables 32 under tension.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A motor vehicle comprising:
   a body;
   a closure panel attached to said body for rotation about a horizontally extending pivot axis located adjacent a lower edge of said closure panel so that said closure panel is pivotable between a closed position in which an upper edge of said closure panel is located adjacent said body and an open position in which said upper edge is displaced from said body; and
   a drive arrangement attached to said body for articulating said closure panel between said open position and said closed position, said drive arrangement including a flexible cable including a first end attached to said closure panel and a drive rod rotatable mounted to said body for rotation about an axis parallel to said horizontally extending pivot axis, a second end of said flexible cable interconnected to said drive rod, said flexible cable adapted to wind about said drive rod and articulate said closure panel between said closed position and said open position when said drive rod is rotated in a first direction.

2. The motor vehicle of claim 1, further comprising a gear fixedly attached to said drive rod, said flexible cable adapted to wind about said gear.

3. The motor vehicle of claim 1, wherein said drive arrangement further includes a drive motor operatively connected to said drive rod for articulating said closure panel between said closed position and said open position.

4. The motor vehicle of claim 1, wherein said drive arrangement includes a biasing arrangement for biasing said closure panel to said open position.

5. The motor vehicle of claim 1, further comprising:
   a pivot rod fixedly attached to said body;
   a sleeve rotatably carried by said pivot rod, said closure panel attached to said sleeve for rotation about said pivot rod; and
   a biasing arrangement including a spring steel member fixedly attached to said pivot rod, said spring steel member biasing said closure panel to said open position.

6. A motor vehicle comprising:

a body;

a closure panel including first and second laterally opposed sides, said closure panel attached to said body for rotation about a horizontally extending pivot axis located adjacent a lower edge of said closure panel so that said closure panel is pivotable between a closed position in which an upper edge of said closure panel is located adjacent said body and an open position in which said upper edge is displaced from said body; and a drive arrangement attached to said body for articulating said closure panel between said open position and said closed position, said drive arrangement attached to said closure panel adjacent at least one of said first and second laterally opposed sides, said drive arrangement including a biasing arrangement for biasing said closure panel to said open position.

7. The motor vehicle of claim 6, wherein said drive arrangement includes first and second flexible cables each including a first end attached to said closure panel adjacent said first and second laterally opposed sides, respectively.

8. The motor vehicle of claim 6, wherein said drive arrangement further includes a drive rod rotatably mounted to said body for rotation about an axis parallel to said horizontally extending pivot axis, a second end of each of said first and second flexible cables interconnected to said drive rod, said first and second flexible cables adapted to wind about said drive rod and articulate said closure panel between said closed position and said open position when said drive rod is rotated in a first direction.

9. The motor vehicle of claim 8, further comprising first and second gears fixedly attached to said drive rod, said first and second flexible cables adapted to wind about said first and second gears, respectively.

10. The motor vehicle of claim 8, wherein said drive arrangement further includes a drive motor operatively connected to said drive rod for articulating said closure panel between said closed position and said open position.

11. The motor vehicle of claim 6, further comprising:

a pivot rod fixedly attached to said body; and a sleeve rotatably carried by said pivot rod, said closure panel attached to said sleeve for rotation about said pivot rod;

said biasing arrangement including a spring steel member fixedly attached to said pivot rod, said spring steel member biasing said closure panel to said open position.

12. The motor vehicle of claim 1, wherein the motor vehicle is a pick-up truck and the closure panel is a tailgate.

13. The motor vehicle of claim 1, wherein said drive arrangement is operative to articulate said closure panel between said open position and said closed position under a source of power.

14. The motor vehicle of claim 6, wherein the motor vehicle is a pick-up truck and the closure panel is a tailgate.

15. The motor vehicle of claim 6, wherein said drive arrangement is operative to articulate said closure panel between said open position and said closed position under a source of power.

16. A motor vehicle comprising:

a body;

a closure panel attached to said body for rotation about a horizontally extending pivot axis located adjacent a lower edge of said closure panel so that said closure panel is pivotable between a closed position in which an upper edge of said closure panel is located adjacent said body and an open position in which said upper edge is displaced from said body; and a drive arrangement attached to said body for articulating said closure panel between said open position and said closed position;

a pivot rod fixedly attached to said body;

a sleeve rotatably carried by said pivot rod, said closure panel attached to said sleeve for rotation about said pivot rod; and a biasing arrangement including a spring steel member fixedly attached to said pivot rod, said spring steel member biasing said closure panel to said open position.

17. The motor vehicle of claim 16, wherein said drive arrangement includes a flexible cable including a first end attached to said closure panel.

18. The motor vehicle of claim 17, further comprising a gear fixedly attached to said drive rod, said flexible cable adapted to wind about said gear.

19. The motor vehicle of claim 17, wherein said drive arrangement further includes a drive motor operatively connected to said drive rod for articulating said closure panel between said closed position and said open position.

20. The motor vehicle of claim 16, wherein said drive arrangement includes a biasing arrangement for biasing said closure panel to said open position.

21. The motor vehicle of claim 16, wherein the motor vehicle is a pick-up truck and the closure panel is a tailgate.

\* \* \* \* \*